United States Patent [19]

Grube

[11] 4,212,384
[45] Jul. 15, 1980

[54] CIRCULATING CONVEYOR

[75] Inventor: Erwin Grube, Bielefeld, Fed. Rep. of Germany

[73] Assignee: Dürkoppwerke GmbH, Bielefeld, Fed. Rep. of Germany

[21] Appl. No.: 940,197

[22] Filed: Sep. 7, 1978

[30] Foreign Application Priority Data

Sep. 9, 1977 [DE] Fed. Rep. of Germany ....... 2740594

[51] Int. Cl.² .......................................... B65G 17/32
[52] U.S. Cl. ................................... 198/684; 198/687
[58] Field of Search ............. 198/678, 683, 684, 685, 198/686, 687, 838; 104/172 C, 172 S

[56] References Cited

U.S. PATENT DOCUMENTS

| 2,678,718 | 5/1954 | Black ................................... 198/684 |
| 2,933,178 | 4/1960 | Hammond ............................ 198/684 |
| 3,727,745 | 4/1973 | Richterkessing ..................... 198/687 |

FOREIGN PATENT DOCUMENTS 644228 10/1950 United Kingdom ..................... 198/686

Primary Examiner—James L. Rowland
Attorney, Agent, or Firm—Karl F. Ross

[57] ABSTRACT

A circulating conveyor, e.g. of the type in which a load carrier passes along an endless track and supports material to be conveyed, e.g. garments suspended by hangers from the load carrier, comprises in addition to the circulating track, a load carrier which runs with a plurality of wheels on the endless rail and has a displacement chain formed by a multiplicity of rigid links each constituted by a rigid bar hinged at its ends to the adjoining links. The lateral flanks of the bar are engageable by a friction drive roller and a counter roller to displace the chain and hence the load carrier along the circulating path.

7 Claims, 3 Drawing Figures

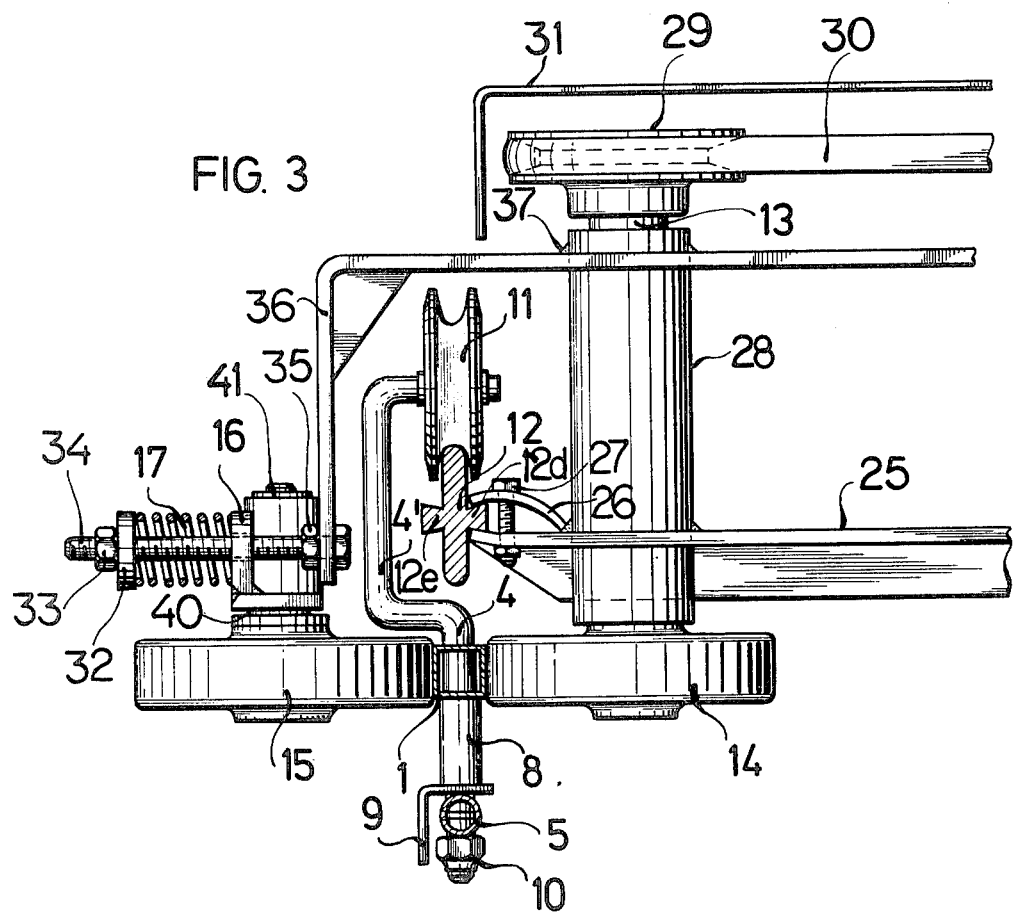

CIRCULATING CONVEYOR

FIELD OF THE INVENTION

The present invention relates to a circulating conveyor and, more particularly, to a conveyor system in which an endless load carrier is displaceable along an endless path on, for example, a rail from which the goods to be transported can be suspended from the load carrier. More particularly, the invention relates to a load carrier for such a conveyor and to a garment carrier using the conveyor and load carrier.

BACKGROUND OF THE INVENTION

It is known to provide suspended conveyor systems in which an endless rail provides a support for a plurality of rollers interconnected by a chain and from which, for example, garments can be suspended on hangers so as to be displaceable between the storage region and a dispensing or loading station, between processing stations or the like.

A conveyor of this type may be provided in a dry-cleaning establishment or other establishment in which it is necessary to deliver garments to a particular station from a store of the garments set back from the dispensing location.

In the conventional system of this type, the endless rail, which can be formed in an oval pattern, generally is suspended from the ceiling or another elevated structure of the establishment and the rollers run upon this rail and are interconnected by a displacement chain of conventional link type. The links are formed as round bodies and are engaged by sprocket wheels at the reversing ends of the conveyor, at least one of the sprocket wheels being driven. The teeth of the sprocket wheels thus engage between the links or bodies of the chain.

Experience has shown that such a drive system and, more generally, circulating conveyor system is very noisy. This is especially the case when the conveyor is driven intermittently and starting and stopping occurs with shocks or suddenly. At these times increased noise results. Furthermore, the interengagement of the links of the chain with the teeth of the sprocket wheel gives rise to considerable wear of both.

OBJECT OF THE INVENTION

It is the object of the present invention to provide an improved circulating or endless conveyor system for suspended loads and a load carrier for such a conveyor system, which obviates the disadvantages of the earlier systems described above and allows the driving of the load carrier to be carried out with a minimum of noise and shocks upon starting and stopping.

SUMMARY OF THE INVENTION

This object and others which will become apparent hereinafter are attained, in accordance with the present invention, in a conveyor system of the circulating or endless type, especially for suspended loads, which comprises an endless rail or tack upon which the load carrier is displaceable, the load carrier being suspended from this rail on a multiplicity of rollers which engage the rail. According to the present invention, the load carrier is formed with a displacement chain constituted by rigid bars coupled together at their ends and having at least one lateral flank or cheek engageable frictionally by a drive roller.

According to the invention, the displacement chain can have a pair of lateral flanks or cheeks which are engageable between a pair of rollers, at least one of which is driven while the other forms a counter-pressure roller urging the chain against the friction-drive roller.

Because of the complete omission of sprocket wheels and teeth which interengage with links of a chain, noise and wear are significantly reduced and, since a friction drive is involved, rather than a positive or entrainment drive using sprocket teeth, the starting and stopping shocks are reduced or eliminated.

According to a feature of the invention, the bar-shaped members of the drive chain are cut away at their ends so that the ends of adjacent chains can overlap to permit articulation of the bars. Advantageously, the bars are rectangular-cross section tubular members, preferably square-section tubular members.

According to yet another feature of the invention, the pivots and the ends of the bars coincide with suspenders by means of which the load carrier is affixed to the axles of the wheels. Each wheel thus can be provided with a bent member, one end of which forms the axle while the other end is turned downwardly to form a pintle or pivot for the respective articulation.

According to still another feature of the invention, the load-supporting portion of the load carrier is formed as a supporting chain constituted by bars of the same length as the bars of the drive chain and also articulated together. The corresponding articulation of the support bars and of the drive bars may be coaxial, i.e. have coincident axes.

Advantageously, the load-support chain lies below the drive chain.

According to yet another feature of the invention, the bars are formed of prismatic or circular profile material, most advantageously tubular material as noted above, with overlapping ends enabling mutual articulation of interconnected joining bars.

The endless conveyor described above has been found to be totally free from the disadvantages of the earlier system and to be substantially less expensive than the earlier arrangement described.

BRIEF DESCRIPTION OF THE DRAWING

The above and other objects, features and advantages of the present invention will become more readily apparent from the following description, reference being made to the accompanying drawing in which:

FIG. 3 is a section corresponding to FIG. 2 through the drive station showing the cooperation of the friction rollers with the drive chain of the conveyor.

Specific Description

Figure 2:
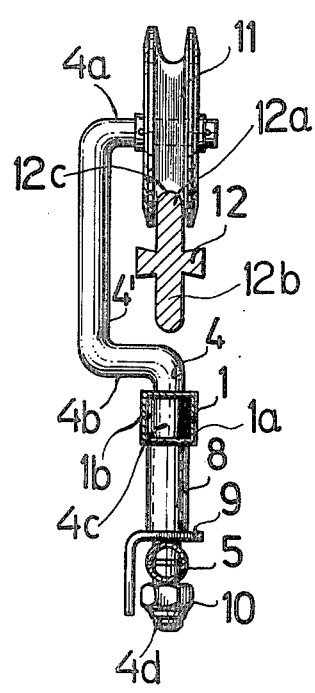
FIG. 2 is a section taken along the line II-II of FIG. 1.
Figure 1:
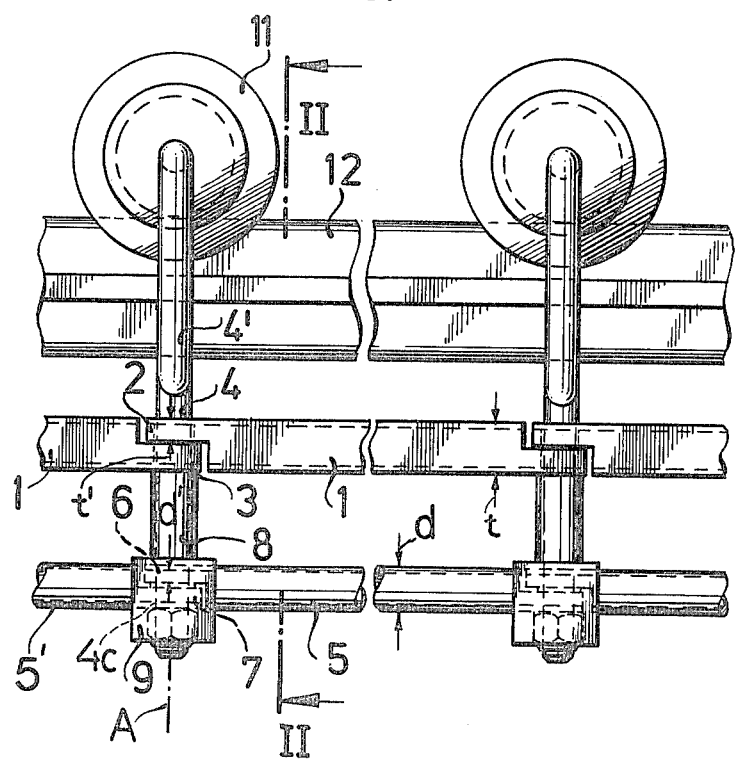
FIG. 1 is a side-elevational view of a portion of an endless conveyor according to the present invention.

The conveyor assembly illustrated in FIGS. 1–3 comprises a support rail or track 12 which may have slender upper and lower portions 12a and 12b which are rounded at 12c, for example, to accommodate the complementary-profile wheels 11 of a load carrier. The wheels 11 support bent stirrup-shaped members 4 each of which comprises a shank 4a which lies generally horizontally and forms the axle for the respective roller 11, a shank 4b parallel to the shank 4a, and the bight 4' between the shanks 4a and 4b.

A downwardly turned stem 4c of the shank 4b forms an articulation for the bars of the chains to be described below.

The drive or displacement chain consists of a succession of bar-shaped members 1 adapted to be subjected to tension and compression without distortion. The bars 1 are articulated at the stems 4 of the respective rollers. The articulations are formed by cut away portions 2 and 3, each of which has a thickness t' which is approximately half the thickness t of the bar 1. As can be seen from FIG. 2, each bar 1 is a square tubular profile. The bar 1 thus forms a link of the drive chain. Each bar 1 has a pair of lateral flanks 1a and 1b which can be frictionally engaged in a manner to be described below.

In addition to the bars 1, the conveyor comprises circular-section tubular bars 5 which can similarly be cut away at 6 and 7 so that the ends of adjacent bars overlap and are articulated to one another by the stem 4c which can be seen in broken lines in FIG. 1.

As in the case of the bars 1, the bars 5 are of a reduced thickness d' at their cut away ends 6 and 7, this reduced thickness d' being approximately half the diameter d of the bars 5.

Thus at corresponding wheels 11, the adjacent bars 1, 1' and 5, 5' of the drive and carrier or support chain, respectively, are articulated at coincident axes or at a common axis as represented by the arrow A in FIG. 1.

Between the drive chain and the support chain surrounding each stem 4c, is a spacer tube 8.

The lower end of each spacer tube 8 locks a sheet metal angle 9 against the respective tube 5. A locking nut 10 is threaded onto the lower end of the stem 4c at its threaded portion 4b to hold the assembly together.

The drive of the conveyor has been illustrated in FIG. 3. In this Figure it can be seen that the lateral projections 12d and 12e of the rail 12 can be clamped on a support 25 of the conveyor by clamping fingers 26 by screws 27. The support 25 may be mounted upon posts not shown.

The support 25 also carries a bearing 28 at each end of the conveyor. The bearings 28 receive shafts 13 which are driven by V-belt pulleys 29 and a belt 30 by an electric motor not shown. Naturally, only one of the shafts 13 at one or the other end of the conveyor need be driven. A hood 31 shields the V-belt 30 and the pulley 29 against contact with the operator and from contaminants.

The lower end of the shaft 13 carries a rubber-surfaced friction drive wheel 14 which engages the cheek 1a of the successive bars 1 of the drive chain.

Against the opposite flank 1b, a counter-pressure roller 15 is urged by a spring 17 which is seated against a washer 32 held by a nut 33 on a screw 34 which is locked by a nut 35 on a bracket 36 connected to the support 25 by being welded at 37 to the bearing 28.

The spring 17 bears upon a lever 16 which is swingable under the force of the spring 17 to urge the wheel 15 against the opposite flank of each tubular member 1.

The wheel 15 is mounted upon a shaft 40 which is journaled in a bearing 41 carried by the lever 16.

Thus when the drive motor (not shown) is operated to drive the belt 30 and the pulley 29, the friction wheel 14 engages the displacement chain formed by the rigid members 1 to advance the load carrier.

The bars 5 may receive hangers upon which garments are mounted. The angle sheet 9 prevents the hangers from interfering with the articulation of the adjoining bars 1, 1' and 5, 5', respectively.

The conveyor of FIGS. 1–3 has been found to be especially quiet in operation and free from shocks upon starting and stopping. Naturally, because of its simplicity, it can be constructed inexpensively.

I claim:

1. An endless conveyor for a suspended load, comprising:
   an endless track;
   a load carrier displaceable along said track and formed with a plurality of wheels riding on said track, said load carrier comprising a drive chain formed by a multiplicity of rigid bars adapted to sustain tensile and compressive stress in the longitudinal dimension, successive bars being articulated together about vertical axes;
   drive means including a friction roller engageable with a flank of said drive chain; and
   a load-support chain for goods to be transported by said conveyor below said drive chain, said support chain being constituted of a plurality of rigid bars articulated together about vertical axes at their ends and each of the same length as a corresponding bar of said drive chain, said load carrier comprising for each wheel supporting same upon said track, a respective stirrup-shaped member having a shank forming an axle for the respective wheel engaging said track, another shank below said track, a bight interconnecting said shanks and a downwardly extending stem from the shank below said track, each of said downwardly extending shanks forming an articulation for adjoining bars of both chains whereby adjoining bars of both chains have coincident articulation axes defined by said stems.

2. The conveyor defined in claim 1 wherein the bars of both said chains are tubular.

3. The conveyor defined in claim 1 wherein the bars of each chain are cut away at their ends and adjacent bars of each chain overlap at said ends to form respective articulations.

4. The conveyor defined in claim 1 wherein the bars of said drive chains are of square-cross section and have a pair of parallel lateral flanks, one of said flanks being engageable by said friction roller, said conveyor further comprising a pressure wheel bearing on the other of said flanks of each of said bars of said drive chain.

5. The conveyor defined in claim 4, further comprising spring means urging said pressure wheel against said drive chain and said drive chain against said friction roller.

6. The conveyor defined in claim 5, further comprising a support carrying said track and provided with at least one bearing receiving a shaft connected to said friction roller, said conveyor also including drive means for rotating said shaft.

7. The conveyor defined in claim 6 wherein the bars of said support chain are of circular-cross section.

* * * * *